United States Patent [19]
Suzuki

[11] Patent Number: 5,111,180
[45] Date of Patent: May 5, 1992

[54] APPARATUS FOR DETECTING RANGE SELECTED IN AUTOMATIC TRANSMISSION

[75] Inventor: Akihiro Suzuki, Shizuoka, Japan
[73] Assignee: Jatco Corporation, Fiji, Japan
[21] Appl. No.: 659,100
[22] Filed: Feb. 22, 1991

[30] Foreign Application Priority Data

Feb. 26, 1990 [JP] Japan .................................. 2-45320

[51] Int. Cl.$^5$ ............................................. G08B 23/00
[52] U.S. Cl. .................................... 340/456; 200/61.88
[58] Field of Search .......................... 340/456; 74/364; 307/9.1, 10.1; 200/61.88, 11 DR

[56] References Cited

U.S. PATENT DOCUMENTS 4,896,135 1/1990 Deeds et al. .......................... 340/456

FOREIGN PATENT DOCUMENTS 2437865 6/1974 Fed. Rep. of Germany .
2128027 4/1982 United Kingdom .

OTHER PUBLICATIONS

Service Manual (Publication No. A261C07) entitled "Nissan Full Range Electronically Controlled Automatic Transmission RE4R01A Type".

Primary Examiner—Leo P. Picard
Assistant Examiner—Lincoln Donovan
Attorney, Agent, or Firm—Ronald P. Kananen

[57] ABSTRACT

An apparatus employs a logic that with N signal lines, there are $2^N$ different states since one signal line has two states, where N is an integer. The number of signal lines has been reduced by connecting the signal lines to different portions of a plurality of contacts. The contacts are arranged to cooperate with a common contact in a predetermined overlapping manner. The overlapping occurs over different positions of a plurality of range positions which this apparatus detects.

6 Claims, 5 Drawing Sheets

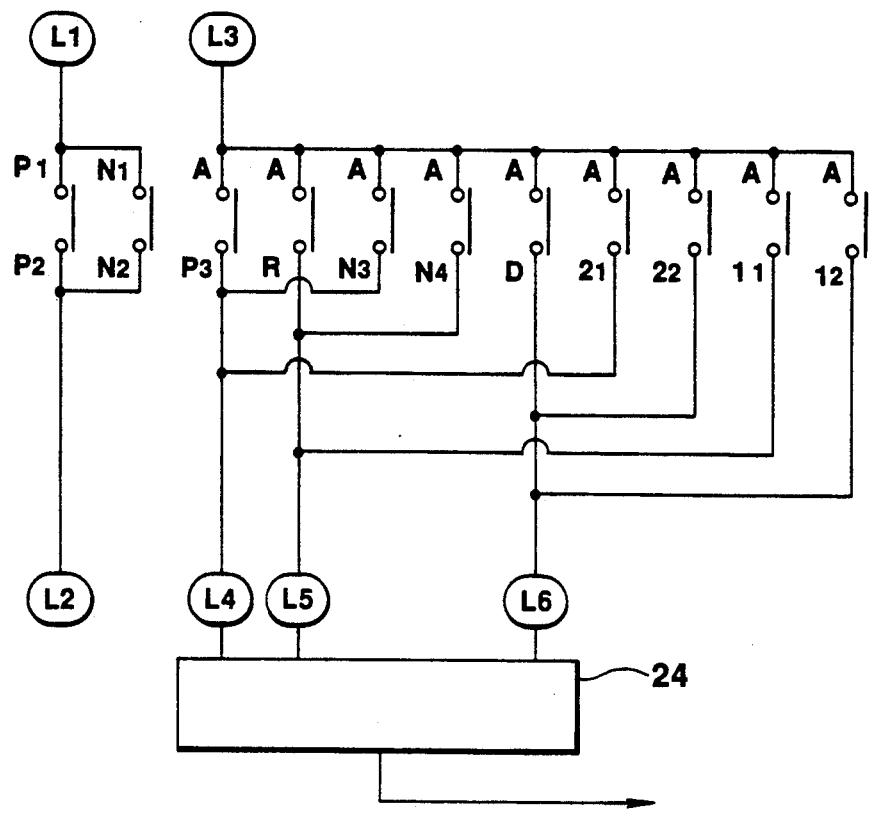

APPARATUS FOR DETECTING RANGE SELECTED IN AUTOMATIC TRANSMISSION

BACKGROUND OF THE INVENTION

The present invention relates to an automatic transmission having a plurality of ranges manually selectable by a driver, and more particularly to an apparatus for detecting in which one of the plurality of ranges the automatic transmission is placed.

In order to control an automatic transmission, it is the common practice to detect in which one of a plurality of manually selected ranges the automatic transmission is placed. Service manual "NISSAN FULL-RANGE ELECTRONICALLY CONTROLLED AUTOMATIC TRANSMISSION E-AT, RE4R01A TYPE" (A261C07) was issued by Nissan Motor Co., Ltd. in Mar., 1987. According to this publication, an automatic transmission of the RE4R01A type is described and known. This known automatic transmission has six manually selectable ranges, namely, P (parking), R (reverse), N (neutral), D (drive), 2 (second), and 1 (first) ranges. As shown in page II-3 of the publication, the automatic transmission has a select range lever which is operatively connected to a manual valve of a hydraulic control circuit (see pages I-56 to I-66 of the publication) and linked to a manual control lever (see page I-88 of the publication) disposed near a driver's seat. The select range lever is moveable to select one of the six range positions. In order to detect in which one of the six ranges the automatic transmission is placed, a so-called inhibitor switch is installed near the select range lever (see page II-3 of the publication). In order to transmit information from the inhibitor switch to an A/T (automatic transmission) control unit (see page I-6 of the publication), six signal lines extend from the inhibitor switch to the A/T control unit. The inhibitor switch comprises a contact support, in the form of a fixed plate, fixedly mounted to the transmission body, a cooperating moveable contact moveable by the select range lever to assume six positions, namely P (parking), R (reverse), N (neutral), D (drive), 2 (second), and 1 (first) positions. Arranged on the contact support are a common stationary contact cooperating with the moveable contact, six individual stationary contacts, and two pairs of normally open contacts. When the moveable contact assumes the P position, one of the two pairs of normally open contacts is closed to allow electric current to pass through a stator motor, and when it assumes the N position, the other of the two pairs of normally open contacts is closed to allow electric current to pass through the stator motor. The six individual stationary contacts are arranged in the six positions, respectively. When the P position, the moveable contact bridges a first one of the individual stationary contacts with the common contact. At the R position, the moveable contact bridges a second one of the individual stationary contacts with the common contact, turning on reverse lamps. At the N position, the moveable contact bridges a third one of the individual stationary contacts with the common contact. At the D position, the moveable contact bridges a fourth one of the individual stationary contacts with the common contact. At the 2 position, the moveable contact bridges a fifth one of the individual stationary contacts with the common contact. At the 1 position, the moveable contact bridges a sixth one of the individual stationary contacts with the common contact. Six signal lines are electrically connected to the six individual stationary contacts, respectively. In order to decide which one of the six positions the moveable contact assumes, the A/T control unit determines which one of the six signal lines is conductive. More specifically, if one of the six signal lines is conductive, and the other five signal lines are non-conductive, it is determined that the moveable contact assumed the corresponding one of the six positions with the individual contact having a conductive signal line.

In addition to the above-mentioned six signal lines connected to the six individual stationary contacts, a seventh signal line is connected to the common contact. Thus, seven signal lines are necessary to detect six ranges selectable in the automatic transmission. In other words, N+1 signal lines are necessary for detecting N ranges selectable in the automatic transmission.

This known apparatus poses a problem that a harness of signal lines becomes thick and thus inflexible. This makes it physically difficult to arrange the harness and connect the harness with another harness.

An object of the present invention is to improve an apparatus of the above-mentioned type such that detection of a plurality of ranges selected in an automatic transmission is conducted with a fewer number of signal lines.

SUMMARY OF THE INVENTION

An apparatus according to the present invention employs a logic that with N signal lines (where N is an integer), there are shown $2^N$ different states since one signal line has two states, namely, a conductive state and a non-conductive state, and thus $2^N$ different ranges selectable in an automatic transmission can be distinguished. Thus, the number of signal lines can be reduced by three in order to distinguish the six ranges, for example, from each other.

According to the present invention, there is provided an apparatus for detecting in which one of a plurality of ranges an automatic transmission is placed, the apparatus comprising:

a contact support;

a cooperating moveable contact moveable relative to said contact support to assume a plurality of positions corresponding to the plurality of ranges, respectively;

a common stationary contact on said contact support cooperating with said moveable contact;

a plurality of of individual stationary contacts cooperable with said common contact, said plurality individual stationary contacts being arranged such that when said moveable contact assumes a first one of said plurality of positions, said moveable contact bridges a first portion of said plurality of individual stationary contacts with said common stationary contact, when said moveable contact assumes a second one of said plurality of positions, said moveable contact bridges a second portion of said plurality of individual contacts with said common stationary contact, and when said moveable contact assumes a third one of said plurality of positions, said moveable contact bridges a third portion of said plurality of individual contacts with said common contact;

signal lines connected to said first, second, and third portions of said plurality of individual statinary contacts in a predetermiend overlapping manner; and means for making a judgement based on information derived from said signal lines of which one of said plurality of positions said moveable contact assumes and generating a range signal indicative of the range selected.

BRIEF DESCRIPTION OF THE DRAWINGS

FIG. 4 is a circuit diagram of the inhibitor switch with an A/T control unit;

FIG. 5 is a table illustrating which one or ones of the signal lines are conductive for different positions, namely P (parking), R (reverse), N (neutral), D (drive), 2 (second), and 1 (first) positions;

DETAILED DESCRIPTION OF THE INVENTION

Figure 1:
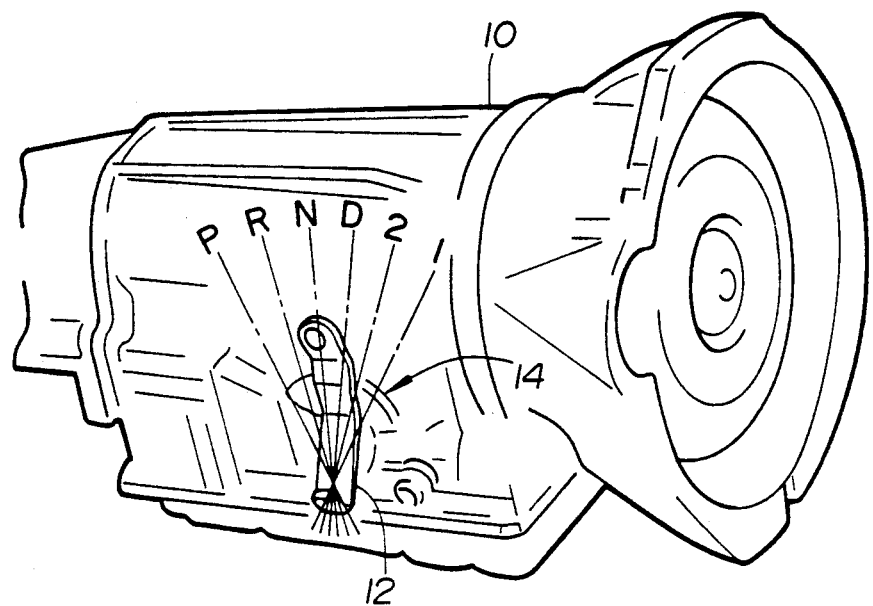
FIG. 1 is a fragmentary perspective view of an automatic transmission showing a select range lever after removing its linkage with a control lever disposed near a driver's seat and an inhibitor switch mounted near the select range lever.

Referring to FIG. 1, there is shown an automatic transmission 10 with a select range lever 12, and an inhibitor switch 14. The automatic transmission 10 has six manually selectable ranges, namely, P (parking), R (reverse), N (neutral), D (drive), 2 (second), and 1 (first) ranges. The select range lever 12 is operatively connected to a manual valve of a hydraulic control circuit, not shown, and linked, via a linkage 16 (see FIG. 2), to a control lever disposed near a driver's seat in the same manner as shown in the before-mentioned publication "NISSAN FULL-RANGE ELECTRONICALLY CONTROLLED AUTOMATIC TRANSMISSION E-AT, RE4R01A TYPE". The select range lever 12 is moveable to assume the six range positions, namely P, R, N, D, 2 and 1, as indicated in FIG. 1. The inhibitor switch 14 is installed to detect in which one of the six ranges the automatic transmission is placed.

Figure 2:
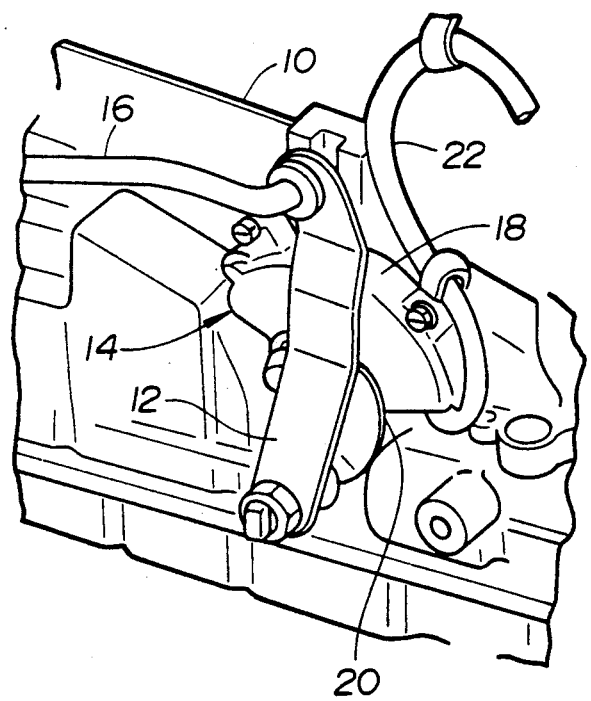
FIG. 2 is an enlarged view of FIG. 1 showing the inhibitor switch with its harness of signal lines.

As best seen in FIG. 2, the inhibitor switch 14 comprises a contact support 18 in the form of a stationary plate fixedly bolted to the transmission 10, and a cooperating moveable contact 20 in the form a moveable plate moveable with the select range lever 12 to assume the positions, namely P, R, N, D, 2 and 1, as indicated in FIG. 1. Extending from the inhibitor switch 18 is a harness 22 binding signal lines.

Figure 3:
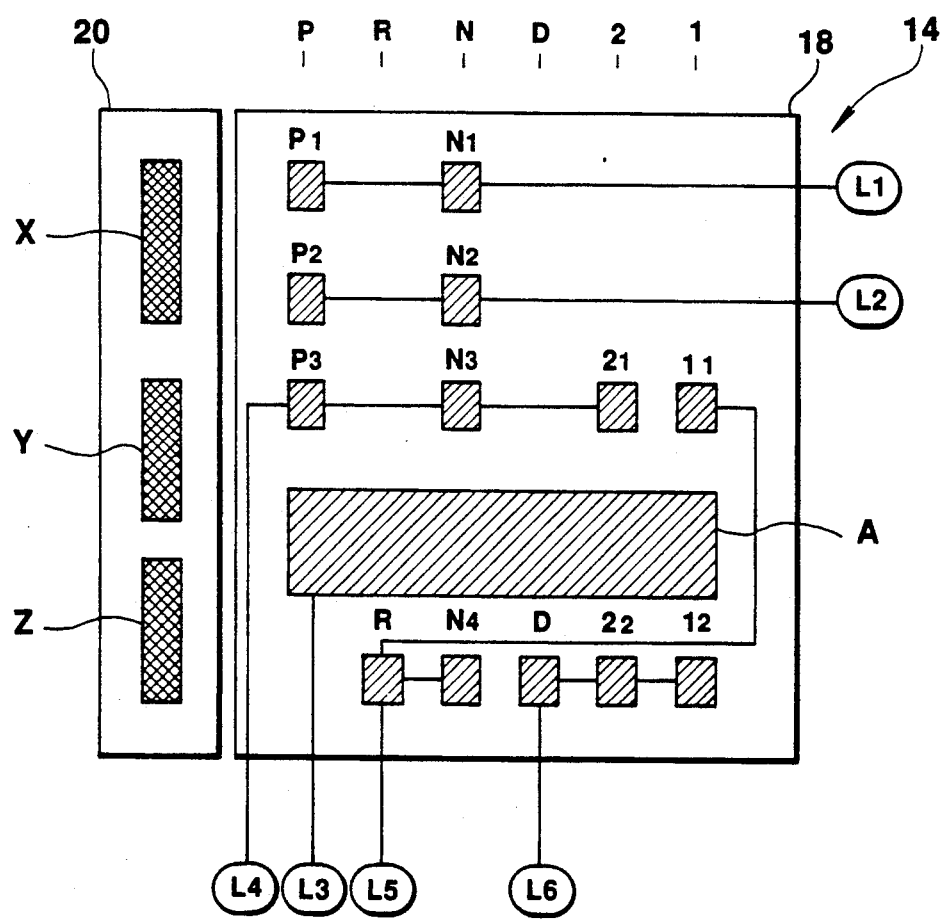
FIG. 3 is a diagram showing an arrangement of contacts of the inhibitor switch and connection of signal lines to different portions of the contacts.

As viewed in FIG. 3, the moveable contact 20 is moveable transversely relative to the contact support 18 to assume the six positions P, R, N, D, 2, and 1. The moveable contact 20 has arranged thereon three contact portions X, Y and Z. Arranged on the contact support 18 are a common stationary contact A cooperating with the moveable contact 20 at its contact portions Y and Z. Two pairs of normally open contacts $P_1$ and $P_2$ and $N_1$ and $N_2$ are arranged on the contact support 18 in the conventional manner. The contacts $P_1$ and $N_1$ are interconnected and connected to a signal line L1, while the contacts $P_2$ and $N_2$ are interconnected and connected to a different signal line L2. When the moveable contact 20 assumes the P position, the contact portion X bridges the contact $P_1$ with the contact $P_2$ to allow electric current to pass between the signal lines L1 and L2. When it assumes the N position, the contact portion X bridges the contacts $N_1$ and $N_2$ to allow electric current to pass between the signal lines $L_1$ and $L_2$. The common contact A is connected to a signal line $L_3$. Nine individual stationary contacts are arranged for the six positions P, R, N, D, 2, and 1. These stationary contacts include a stationary contact $P_3$ for the P position, a stationary contact R for the R position, two stationary contacts $N_3$ and $N_4$ for the N position, a stationary contact D for the D position, two stationary contacts $2_1$ and $2_2$ for the 2 position, and two stationary contacts $1_1$ and $1_2$ for the 1 position. When the moveable contact 20 assumes the P position, the contact portion Y bridges the contact $P_3$ with the common contact A. When it assumes the R position, the contact postion Z bridges the contact R with the common contact A. When it assumes the N position, the contact portion Y bridges the contact $N_3$ with the common contact A and at the same time the contact portion Z bridges the contact $N_4$ with the common contact A. When the moveable contact 20 assumes the D position, the contact portion Z bridges the contact D with the common contact A. When the moveable contact 20 assumes the 1 position, the contact portion Y bridges the contact $1_1$ with the common contact A, and at the same time the contact portion Z bridges the contact $1_2$ with the common contact A. The common contact A is connected to a signal line L3. Three signal lines L4, L5, and L6 are connected to the nine stationary contacts which are arranged for six different positions P, R, N, D, 2, and 1. Among these three signal lines, the signal line L4 is connected to the contact $P_3$ for the P position, to the contact $N_3$ for the N position, and also to the contact $2_1$ for the 2 position since the contacts $P_3$, $N_3$, and $2_1$ are interconnected. The signal line L5 is connected to the contact R for the R position, to the contact $N_4$ for the N position, and also to the contact $1_1$ for the 1 position since the contacts R, $N_4$, and $1_1$ are interconnected. The signal line $L_6$ is connected to the contact D for the D position, to the contact $2_2$ for the 2 position, and also to the contact $1_2$ for the 1 position since the contacts D, $2_2$, and $1_2$ are interconnected. The three signals lines $L_4$, $L_5$, and $L_6$, are connected to the individual stationary contacts in a predetermined overlapping manner, overlapping over different positions of the plurality of positions P, R, N, D, 2, and 1.

The signal lines L1 and L2 are electrically connected to a stator motor drive circuit such that when both of these signal lines L1 and L2 are connected, electric current is allowed to pass through the stator motor. The signal line L3, connected to the common contact A, is always connected to an electric power source and thus subject to a predetermined voltage. The three signal lines L4, L5, and L6 are connected to a microcomputer based A/T control unit 24 as shown in FIG. 4.

The operation is described as follows. When the moveable contact 20 is moved to the P position, the contacts $P_1$ and $P_2$ are bridged by the contact portion X and thus become conductive, allowing electric current to pass through the stator motor. In this P position, the predetermined voltage is applied to the signal line L4 since the contact $P_3$ and the common contact A are bridged by the contact portion Y and thus become conductive. When the moveable contact 20 assumes the R position, the predetermined voltage is applied to the signal line L5 since the contact R and the common contact A are bridged by the contact portion Z and thus become conductive. When the moveable contact 20 assumes the N position, the predetermined voltage is applied not only to the signal line L5, but also to the signal line L4 since the contact $N_4$ and the common contact A are bridged by the contact portion Z and the contact $N_3$ and the common contact A are bridged by the contact portion Y. When the moveable contact 20 assumes the D position, the predetermined voltage is applied to the signal line L6 since the contact D and the common contact A are bridged by the contact portion Z. When the moveable contact assumes the 2 position, the predetermined voltage is applied not only to the signal line L6 but also to the signal line L4 since the contact $2_2$ and the common contact A are bridged by the contact portion Z and the contact $2_1$ and the common contact A are bridged by the contact portion Y. Lastly, when the moveable contact 20 assumes the 1 position, the predetermined voltage is applied not only to the signal line L6 but also to the signal line L5 since the contact $1_2$ and the common contact A are bridged by the contact portion Z and the contact $1_1$ and the common contact A are bridged by the contact portion Z. The operation is readily confirmed by referring to the table shown in FIG. 5.

Based on states of the three signal lines L4, L5, and L6, the A/T control unit 24 determines in which one of the six positions P, R, N, D, 2, and 1 the moveable contact 20 is placed and generates a range signal indicative of the range selected. The control unit 24 includes a ROM for storing the program as illustrated in the flow diagram in FIG. 6.

Figure 6:
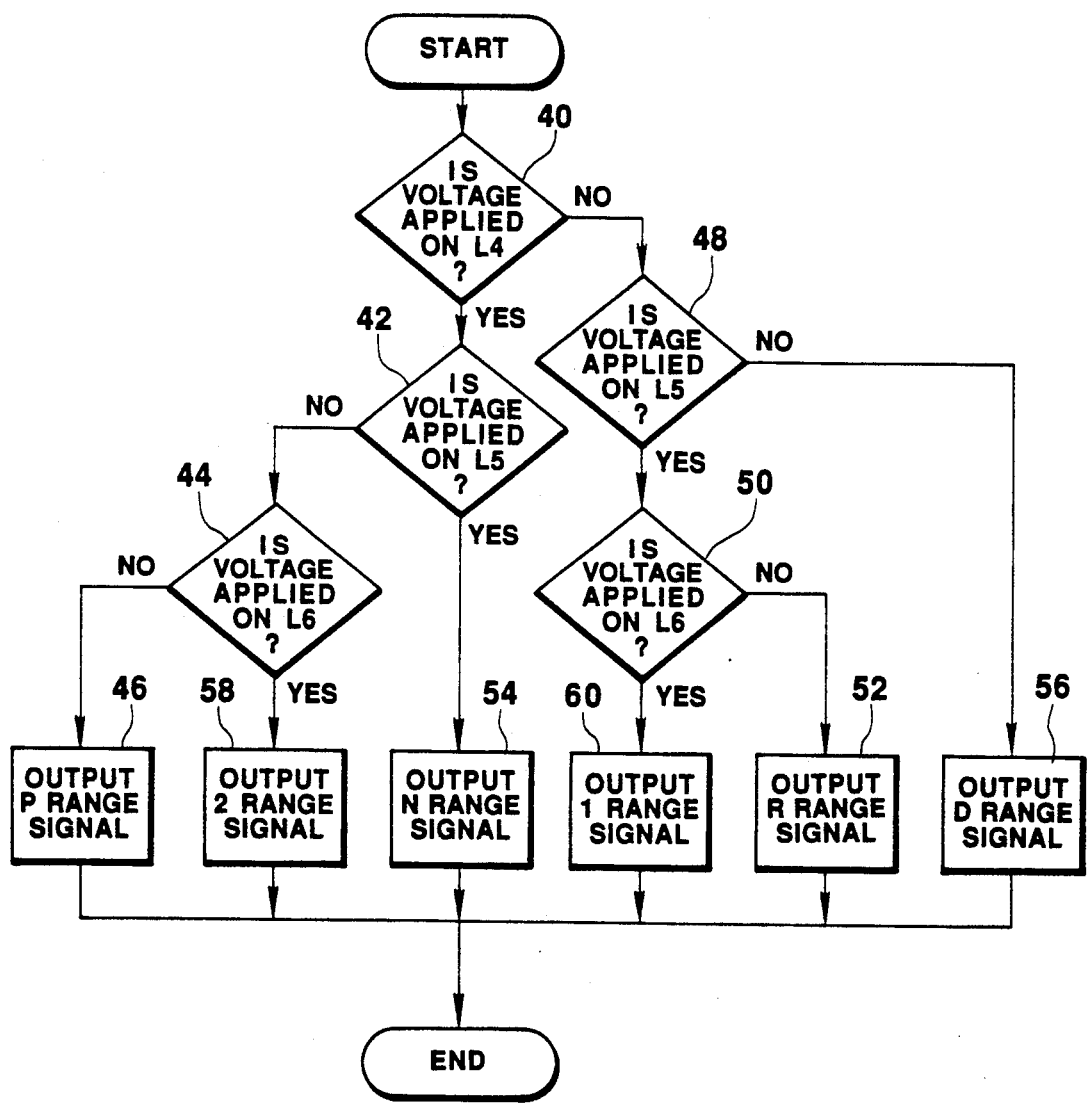
FIG. 6 is a flow diagram of a program stored and executed by the A/T control unit.

In FIG. 6, if an inquiry at a step 40 is affirmative, an inquiry at a step 42 is negative, and an inquiry at a step 44 is negative, a D range signal is outputted at a step 46. If the inquiry at the step 40 is negative, an inquiry at a step 48 is affirmative, and an inquiry at a step 50 is negative, a R range signal is outputted at a step 52. If the inquiry at the step 40 is affirmative, and the inquiry at the step 42 is affirmative, a N range signal is outputted at a step 54. If the inquiry at the step 40 is negative, and the inquiry at the step 48 is negative, a D range signal is outputted at a step 56. If the inquiry at the step 40 is affirmative, the inquiry at the step 42 is negative, and the inquiry at the step 44 is affirmative, a 2 range signal is outputted at a step 58. If the inquiry at the step 40 is negative, the inquiry at the step 48 is affirmative, and the inquiry at the step 50 is affirmative, a 1 range signal is outputted at a step 60. From the preceding description, it will be appreciated that with three signal lines L4, L5, and L6, the six range positions P, R, N, D, 2, and 1 can be distinguished. If desired, two additional positions may be added and eight positions can be distinguished with three signal lines.

Figure 7:
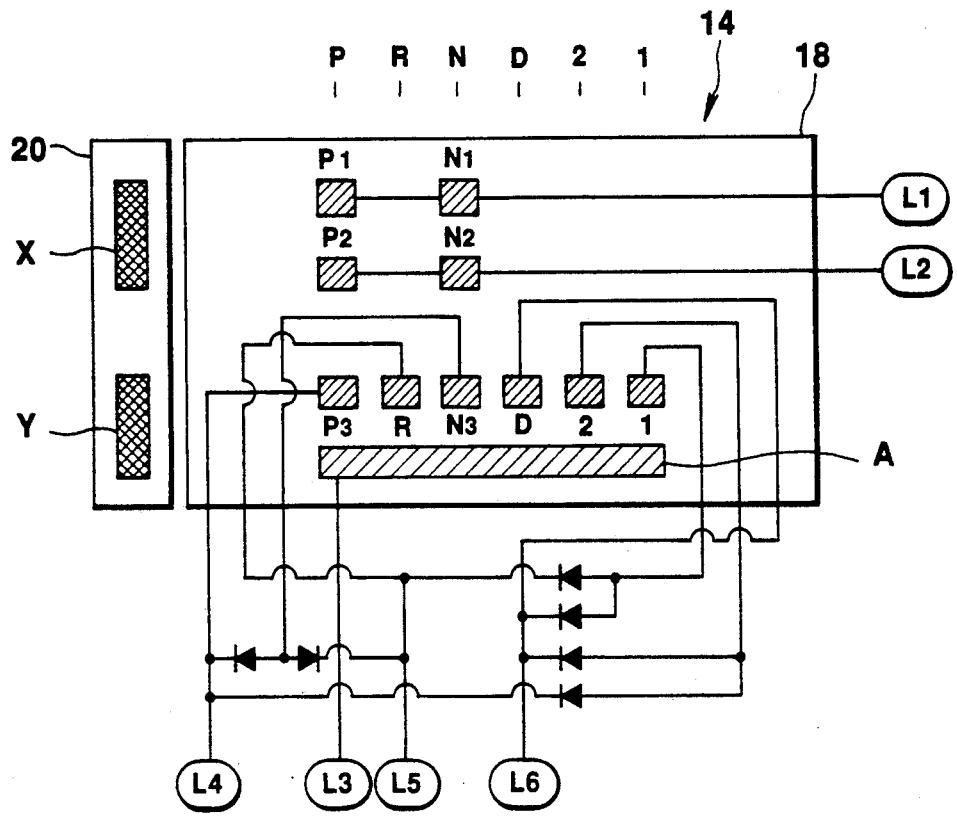
FIG. 7 is a similar view to FIG. 3 showing a second embodiment.
Figure 8:
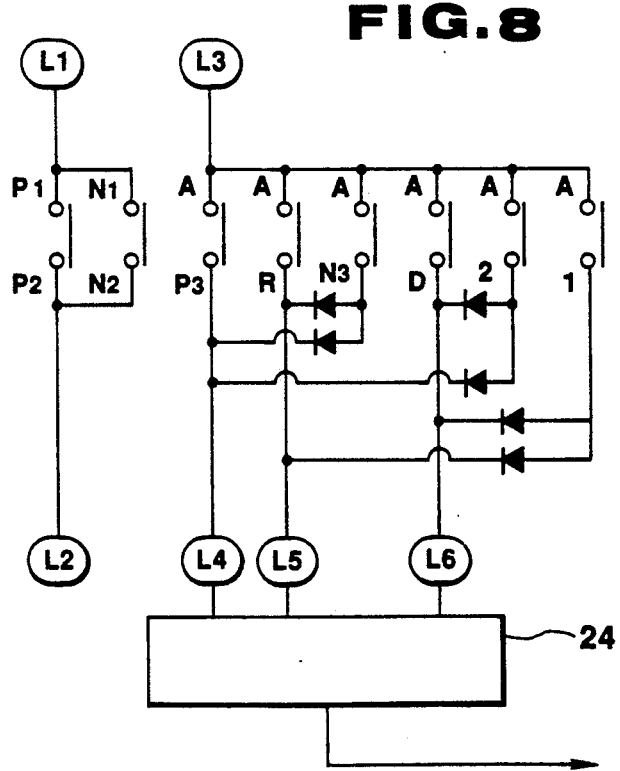
FIG. 8 is a similar view to FIG. 4 showing the second embodiment.

Referring to FIGS. 7 and 8, the second embodiment is briefly described. The same reference numerals and characters used in FIGS. 1 to 5 are used to indicate same or similar parts. This second embodiment is substantially the same as the first embodiment previously described. However, an arrangement of contacts adapted to be bridged with a common contact A and their connection with signal lines L4, L5, and L6 is different as can be readily confirmed by comparing FIG. 7 with FIG. 3, or comparing FIG. 8 with FIG. 4.

Referring to FIG. 7, six stationary contacts $P_3$, R, $N_3$, D, 2, and 1 are arranged in six different positions P, R, N, D, 2, and 1, respectively. As shown in FIG. 7, the contact $N_3$ for the N position is connected via a diode to the signal line L4 which is connected to the contact $P_3$ for the P position. The contact 2 for the 2 position is connected via a diode to the signal line L4. The same contact $N_3$ is connected via a diode to the signal line L5 which is connected to the contact R for the R position. The contact 1 for the 1 position is connected via a diode to the signal line L5. The same contact 1 is connected via a diode to the signal line L6 which is connected to the contact D for the D position. The contact 2 for the 2 position is connected via a diode to the signal line L6. According to the second embodiment, the number of contacts adapted to be bridged with the common contact is reduced and the number of contact portions on the moveable contact 20 is reduced to two. The second embodiment is substantially the same as the first embodiment in operation.

From the preceding description, it will now be appreciated that the number of signal lines is reduced, making it easy to arrange a harness for the signal lines and connect the harness with another harness.

What is Claimed Is:

1. An apparatus for detecting in which one of a plurality of ranges an automatic transmission is placed, the apparatus comprising:

a contact support;

a cooperating moveable contact moveable relative to said contact support to assume a plurality of positions corresponding to the plurality of ranges, respectively;

a common stationary contact on said contact support cooperating with said moveable contact;

a plurality of individual stationary contacts cooperable with said common contact, said plurality of individual stationary contacts being arranged such that when said moveable contact assumes a first one of said plurality of positions, said moveable contact bridges a first portion of said plurality of individual stationary contacts with said common stationary contact, when said moveable contact assumes a second one of said plurality of positions, said moveable contact bridges a second portion of said plurality of individual contacts with said common stationary contact, and when said moveable contact assumes a third one of said plurality of positions, said moveable contact bridges a third portion of said plurality of individual contacts with said common contact;

signal lines connected to said first, second, and third portions of said plurality of individual stationary contacts in a predetermined overlapping manner; and means for making a judgement based on information derived from said signal lines which one of said plurality of positions said moveable contact assumes and generating a range signal indicative of a range selected.

2. An apparatus as claimed in claim 1, wherein said plurality of individual stationary contacts are divided and consist of a plurality, corresponding in number to said plurality of positions, of groups, each group including at least one stationary contact.

3. An apparatus as claimed in claim 1, wherein said plurality of individual stationary contacts are divided and consist of a plurality, corresponding in number to said plurality of positions, of groups, some of said groups including two stationary contacts.

4. An apparatus as claimed in claim 3, wherein said signal lines include two different signal lines connected to said two stationary contacts of one group, respectively.

5. An apparatus as claimed in claim 1, wherein said plurality of individual stationary contacts are divided and consist of a plurality, corresponding in number to said plurality of positions, of groups, each group including one stationary contact.

6. An apparatus as claimed in claim 5, wherein said signal lines include two different signal lines connected via two different diodes to the same stationary contact of one group.

* * * * *